(12) United States Patent
Meincke et al.

(10) Patent No.: US 9,644,117 B2
(45) Date of Patent: May 9, 2017

(54) ADHESIVE COMPOSITION

(71) Applicant: ARTIMELT AG, Sursee (CH)

(72) Inventors: Olaf Meincke, Bern (CH); Philip Andres, Küsnscht (CN); Thomas Griebel, Hünenberg (CH); Benno Blickenstorfer, Basel (CH)

(73) Assignee: ARTIMELT AG, Sursee (CH)

( * ) Notice: Subject to any disclaimer, the term of this patent is extended or adjusted under 35 U.S.C. 154(b) by 0 days.

(21) Appl. No.: 15/037,544

(22) PCT Filed: Nov. 13, 2014

(86) PCT No.: PCT/EP2014/074519
§ 371 (c)(1),
(2) Date: May 18, 2016

(87) PCT Pub. No.: WO2015/074953
PCT Pub. Date: May 28, 2015

(65) Prior Publication Data
US 2016/0289508 A1    Oct. 6, 2016

(30) Foreign Application Priority Data
Nov. 19, 2013  (EP) ..................... 13193519

(51) Int. Cl.
| | | |
|---|---|---|
| *C09J 9/00* | (2006.01) | |
| *C09J 5/00* | (2006.01) | |
| *C08K 9/10* | (2006.01) | |
| *C08K 9/02* | (2006.01) | |
| *C09K 9/02* | (2006.01) | |
| *C08K 5/00* | (2006.01) | |
| *C09J 11/06* | (2006.01) | |
| *G01K 11/16* | (2006.01) | |
| *C09J 153/02* | (2006.01) | |

(52) U.S. Cl.
CPC ............... *C09J 9/00* (2013.01); *C08K 5/0041* (2013.01); *C08K 9/10* (2013.01); *C09J 5/00* (2013.01); *C09J 11/06* (2013.01); *C09J 153/02* (2013.01); *C09J 153/025* (2013.01); *C09K 9/02* (2013.01); *G01K 11/16* (2013.01)

(58) Field of Classification Search
CPC ..... C09J 9/00; C09J 5/00; C09J 11/06; C08K 5/0041; C08K 9/10
See application file for complete search history.

(56) References Cited

U.S. PATENT DOCUMENTS

| | | | | |
|---|---|---|---|---|
| 4,391,662 | A | * | 7/1983 | Mauthe ................ B29C 66/97 116/200 |
| 5,128,386 | A | | 7/1992 | Rehmer et al. |
| 5,223,645 | A | | 6/1993 | Barwich et al. |
| 5,281,570 | A | | 1/1994 | Hasegawa et al. |
| 2007/0054088 | A1 | | 3/2007 | Matijasic et al. |

FOREIGN PATENT DOCUMENTS

| | | |
|---|---|---|
| CA | 2 005 283 C | 6/1990 |
| CA | 1 337 615 C | 11/1995 |
| DE | 38 44 444 A1 | 8/1990 |
| DE | 10 37 079 A1 | 5/1992 |
| DE | 12 23 976 A1 | 1/1993 |
| DE | 103 04 795 A1 | 8/2004 |
| EP | 0 054 155 A1 | 6/1982 |
| EP | 0 346 734 A2 | 12/1989 |
| EP | 0 377 199 A2 | 7/1990 |
| EP | 2 431 444 A1 | 3/2012 |
| JP | 2001-247828 A | 9/2001 |
| WO | 2004/039683 A1 | 5/2004 |
| WO | 2004/083302 A1 | 9/2004 |
| WO | 2010/006447 A1 | 6/2010 |

OTHER PUBLICATIONS

International Search Report Corresponding to PCT/EP2014/074519 mailed Feb. 9, 2015.
Written Opinion Corresponding to PCT/EP2014/074519 mailed Feb. 9, 2015.

* cited by examiner

*Primary Examiner* — Robert Harlan
(74) *Attorney, Agent, or Firm* — Davis & Bujold PLLC; Michael J. Bujold

(57) ABSTRACT

An adhesive compositions which shows a first color change when the ambient temperature is increased to a temperature of $\geq T_1$ and a second color change when the ambient temperature is lowered to a temperature of $\leq T_2$, wherein $T_1 > T_2$. Such adhesive compositions have advantageous properties, in particular at security applications.

18 Claims, 1 Drawing Sheet

ADHESIVE COMPOSITION

The invention relates to an adhesive composition with two thermal color changes. The invention further relates to the use and production of a system comprising the adhesive composition with two thermal color changes.

It is known that on heating close to the melting point, thermoplastic adhesives loose their adhesive performance, meaning that a bond site may easily become parted. Severe cooling causes adhesives to become brittle and fragmented, allowing easy break-up of a bond site. A parted or broken-up bond site can usually be bonded again by an operation of warming the adhesive at the bond site, followed by application of pressure to the bond site and cooling to room temperature. Parting/break-up and rebonding of the bond site remain generally unnoticed, this being a disadvantage particularly in the context, of safety-relevant applications.

There are in fact chemical compounds known which irreversibly show color changes and which can therefore be used to display instances of the temperature exceeding or falling below certain limit temperatures. The number of such available compounds, however, is highly limited, and the limit temperatures are frequently unsuitable to the specific application scenarios.

Chemical compounds and compositions which show reversible color changes of a particular limit temperature (based on changes in the molecular or crystal structure) are likewise known in relatively high diversity. A reversible color change (known as thermochromism), however, is not readily employable for safety-relevant applications, since temperature fluctuations to below and above the limit temperature are not permanently indicated.

There are also thermochromic compositions known which exhibit what is called a memory effect. The color change, once it has occurred, is therefore not immediately reversed when the temperature rises above or below the limit temperature again, but is instead only reversed on further heating or cooling. Compositions of this kind are described in EP 2 431 444 A1, for example. Memory-effect thermochromic compositions of this kind have not so far been proposed in connection with adhesive compositions.

It is therefore the object of the invention to overcome the above-described disadvantages of adhesive compositions, and in particular to provide an adhesive composition which has improved safety properties based on color changes depending on the ambient temperature of an adhesive and of a bond site.

These objects are achieved by the features set out in the independent claims.

The invention relates to an adhesive composition which exhibits a first color change on an increase in the ambient temperature to a temperature $\geq T_1$, and a second color change on a lowering of the ambient temperature to a temperature $<T_2$, where $T_1 > T_2$.

The fact that an adhesive composition of the invention exhibits two color changes makes it possible to indicate not only that a temperature has fallen below a temperature $T_2$ but also that a temperature has exceeded a temperature $T_1 > T_2$. The color changes here may be based either on a single color former, which reversibly changes its color with a memory effect, or they are based on different color formers. If both color changes are based on a reversible thermochromism with memory effect, it is judicious to take further precautions in order to allow safety-relevant applications, as will be elucidated in detail below.

The adhesive composition is preferably thermoplastic (so-called hot-melt composition). These are adhesive compositions which are solid at room temperature and are substantially free of water and of solvent, said compositions preferably being adhesives (hot-melt pressure sensitive adhesives, HMPSAs) which processed from the melt and which on cooling undergo physical setting with solidification.

Thermoplastic adhesive compositions of the invention preferably have a melt viscosity in the range from 1 Pa*s to 1000 Pa*s, preferably from 10 Pa*s to 40 Pa*s, at a temperature of 160° C. The melt viscosity here and below is determined according to DIN EN ISO 3219, cone/plate method.

The adhesive composition may in particular be post-crosslinkable, more particularly by exposure to UV radiation. For this purpose the chemically crosslinkable polymer matrix may be formed of prepolymers which have crosslinked on induction by irradiation. Suitable prepolymers in this context are selected in terms or their molecular weight preferably in that they give the resultant thermoplastic adhesive composition, especially after crosslinking, a high strength at room temperature (up to the point of a thermoset), yet during processing they give the melt a viscosity suitable for conventional hot-melt application apparatus. Typical melt viscosities here are those specified above.

According to one working example particularly preferred for the purposes of the invention, UV-crosslinking acrylates are used as prepolymers in the hot-melt composition. Through irradiation with high-energy light, especially UV light in the wavelength range from about 200 nm to 450 nm, the prepolymers can be induced to undergo crosslinking. Particularly preferred UV-crosslinking acrylate prepolymers are those of the acResin product family from BASF, such as acResin A 204 UV or DS 3532, for example. Of course, combinations of such polymers are possible as well. These substances are distinguished by copolymerized monomers to which UV-activatable photoinitiator groups are chemically bonded using a spacer group. The addition of low molecular mass photoinitiators is therefore not necessary in order to achieve sufficient and rapid crosslinking. For the purposes of the invention, of course, it is likewise possible to provide customary photoinitiators in the adhesive composition, which bring about accelerated onset of prepolymer crosslinking. Photoinitiators suitable in this regard are, for example, acetophenone, benzoin ethers, benzyl dialkyl ketols, or derivatives thereof. The amount of photoinitiator is typically small, preferably 0.05 to 10 parts by weight, more preferably just 0.1 to 2 parts by weight of the adhesive composition. With particular preference copolymerized photoinitiators are employed, examples being ethylenically unsaturated compounds having a photoinitiator group, more particularly in a fraction of 0.05 to 10 wt %, preferably of 0.1 to 2 wt %, more preferably of 0.1 to 1 wt % of the adhesive composition. Compounds of this kind are known, for example, from EP-A-346 734, EP-A-377 199 (claim 1), DE-A-40 37 079 (claim 1) or DE-A-38 44 444 (claim 1); the disclosure content of the stated documents is included by reference with regard to these photoinitiators.

Adhesives which are post crosslinkable on exposure to UV radiation and can be used for the purposes of the invention are described in principle, for example, in WO 2004/083302 (subject to the proviso of the thermal color changes, which are not disclosed therein). The disclosure content of this document is included by reference with regard to such compositions. Compositions of this kind comprise a meltable polyacrylate crosslinkable using UV light, and optionally additives, and also at least one oligomeric compound having UV-crosslinkable functional groups which are reactive with the polyacrylate.

In further embodiments, the adhesive composition of the invention has constituents selected from the following categories:

Elastomers

Saturated thermoplastic polystyrene elastomers, TPS elastomers for short, preferably: styrene-ethylene-butylene copolymers, SEB for short; styrene-ethylene-propylene copolymers, SEP for short; styrene-ethylene-ethylene-propylene copolymers, SEEP for short; styrene-ethylene-butylene-styrene copolymers, SEBS for short; styrene-ethylene-propylene-styrene copolymers, SEPS for short; styrene-ethylene-ethylene-propylene-styrene copolymers, SEEPS for short; and combinations thereof; unsaturated thermoplastic TPS elastomers, preferably: styrene-butadiene block copolymers, SB for short; styrene-isoprene block copolymers, SI for short; styrene-butadiene-butylene block copolymers, SBB for short; styrene-butadiene-isoprene block copolymers, SBI for short; styrene-butadiene-styrene block copolymers, SBS for short; styrene-butadiene-butylene-styrene block copolymers, SBBS for short; styrene-isoprene-styrene block copolymers, SIS for short; styrene-butadiene-isoprene-styrene block copolymers, SBIS for short; and combinations thereof.

Tackifier Resins

Aliphatic, cycloaliphatic and aromatic hydrocarbon-based resins; resin (esters); terpene-based resins (including phenolic); tall oil; pentaerythritol resins, especially hydrogenated pentaerythritol resins; glycerol resins, especially hydrogenated glycerol resins; hydroabietyl resins; olefin resins; pinene resins; β-methylstyrene resins; styrene resins; coumarene-indene resins; melamine resins; polyethyleneimine resins; coumarone resins; and combinations thereof.

Plasticizers

Phthalates; adipates; citrates; phosphates; trimellitic acid; sulfonic acid; refined naphthalene oils; white oils, polybutylene-polyisobutylene copolymers; alkyl esters of cyclohexanedicarboxylic acid and adipic acid; acrylate plasticizer resins, especially poly-n-butyl acrylate; polyvinyl methyl ether; and mixtures thereof.

Stabilizers

Sterically hindered phenols, (especially Irganox® products from the manufacturer BASF, such as, for example, sterically hindered phenols as radical on phosphites (e.g., Irgafos® products from BASF)); sterically hindered lactones (especially Irganox™ products from BASF, such as Irganox™ HP-136, for example); sterically hindered amines; and combinations thereof.

Crosslinkers

Metal salts, preferably zinc acetate, magnesium acetate or zirconium salts; aziridines, glyoxalates; triethylene glycol divinyl ether; acetylacetonates; and combinations thereof.

In 100 wt % of total composition, thermolastic adhesive compositions of the invention may preferably comprise;
- 20 to 80 wt % (more particularly 20-45 wt %) of one or more block copolymers, more particularly as specified above;
- 5 to 80 wt % (more: particularly 20-60 wt %) of one or more tackifier resins, more particularly as specified above;
- 0 to 60 wt % (more particularly 0.1-50 wt %, further in particular 20-40 wt %) of a plasticizer, more particularly as specified above; and
- optionally: 0.1 to 5 wt % (more particularly 1 to 3 wt %) of a crosslinker, more particularly as specified above;
- optionally: 0.1 to 5 wt % (more particularly 0.5 to 2 wt %) of a stabilizer, more particularly as specified above.

Both the first and the second color changes of the adhesive composition may be reversible. If the color change or changes are reversible, then in the case of safety-relevant applications it is necessary to take suitable measures to ensure the later recognizability of color changes that have occurred before. For the purposes of the invention, this may preferably be done by utilizing, for the first and second color changes, a color former system which exhibits a temperature dependent, reversible change in color, but with this change in color having a memory effect. The change in color, while being reversible, has a hysteresis which covers a maximally wide temperature range.

Preferred temperatures $T_1$ and/or $T_2$ for the purposes of the invention are as follows:

Temperature $T_1$: in the range from +40° C. to +90° C.; more particularly +50° C. to +90° C., or +40° C. to +80° C., or +60° C. to +30° C., or +40° C. to +70° C., or +70° C. to +90° C., +40° C. to +60° C.;

Temperature $T_2$: in the range from −45° C. to −5° C.; more particularly −35° C. to −5° C., or −45° C. to −15° C., or −25° C. to −5° C., or −45° C. to −25° C.;

and also all combinations of these temperatures $T_1$ and $T_2$, adapted to the particular practical requirements. Where such combinations $T_1$ and $T_2$ are covered by the hysteresis of a reversible color switch, diverse possibilities arise for the purposes of the invention for obtaining adhesive compositions which have very flexible possibilities for use, by simple means. Thus, for example, a system can be provided with a reversible color change which covers, for example, a hysteresis in the range from −14° C. to 74° C. and which at low temperatures exhibits a blue color but at high temperatures is substantially colorless. If this system is provided at RT in the blue state, this blue color disappears only at a temperature of 74° C., but retains this color even at arbitrarily low temperatures. If the blue color has disappeared, therefore, this means that the adhesive composition was exposed to a temperature of 74° C. or more. In order to enable complete security against manipulation, it is merely necessary to ensure that the fact of a temperature having exceeded 74° C. cannot be concealed by the subsequent re-establishment of the blue color by cooling to a temperature of −14° C. or less. For this purpose it is sufficient to provide a further indicator which changes (preferably) irreversibly at a temperature of −14° C. or warmer, but well below RT, preferably exhibiting a change in color.

Alternatively it is possible to provide the same system at RT in the colorless state. It remains colorless even at arbitrarily high temperatures, but a change in color to blue occurs at a temperature of −14° C. In order to allow complete security against manipulation, all that need now be ensured is that the fact of the temperature going below −14° C. cannot be concealed by subsequently re-establishing the colorless state by heating to a temperature of 74° C. or more. For this it is sufficient to provide a further indicator which changes irreversibly at a temperature (well) above RT, but less than 74° C., preferably exhibiting a change in color.

It can be seen that in this way there is a great flexibility in the provision of a very wide variety of color change systems, no longer tied merely to the few available, irreversibly changing color markers.

The nature of the adhesive composition is preferably such that only the first color change, or only the second color change, or—very preferably—both the first and the second color changes is/are brought about by an encapsulated color pigment or two or more encapsulated color formers.

Encapsulated color formers which can be utilized for the purposes of the invention are known as such for example from EP 2 431 444 A1, but not for use in adhesive compositions of the invention. Document EP 2 431 444 A1 is incorporated in its entirety here by reference.

One or more color formers used in the adhesive composition may be selected from the group consisting of triphenylmethane compounds, fluoran compounds, phenol-thiazine compounds, indolylphthalido compounds, leucoauramine compounds, spiropyran compounds, rhodamine lactum compounds, azaphthalide compounds, benzoxazine compounds, diphenylmethane phthalides, phenylindolyl phthalides, indolyl phthalides, diphenylmethane azaphthalides, phenylindolyl azaphthalides, fluorans, styrylquinolines, diazarhodamine lactones.

Particularly preferred are the compounds identified in paragraph [0013] of DE 42 23 976 A1 and paragraph [0012] of EP 2 431 444 A1; the disclosure content, of these documents is incorporated by reference into the present description in relation to these specific compounds.

Combinations of the aforementioned color formers are of course possible, not least in order to generate mixed colors.

One or more of the color pigments used in the adhesive composition may have been encapsulated with a developer, the developer being selected from the group consisting of compounds of the formula (I)

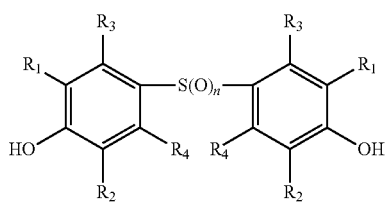

(I)

in which $R_1$ and $R_2$ are each a hydrogen atom, an alkyl radical having 1 to 3 carbon atoms, or a halogenated alkyl radical having 1 to 3 carbon atoms, a hydroxyl radical, a cyclohexyl radical or a phenyl radical (but if one of $R_1$ and $R_2$ is either cyclohexyl or phenyl radical, then the other is a hydrogen atom), $R_3$ and $R_4$ are each a hydrogen atom, an alkyl radios having 1 to 15 carbon atoms, a halogenated alkyl radical having 1 to 15 carbon atoms, a hydroxyl radical, a cyclohexyl radical, or a phenyl radical, where two of $R_1$ to $R_4$ may be different or identical to one another, but not all of $R_1$ to $R_4$ may be hydrogen atoms, and n is an integer 0, 1 or 2;

compounds of the formula (II)

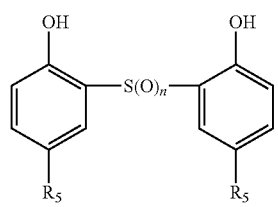

(II)

in which $R_5$ is an alkyl radical having 1 to 12 carbon atoms, a cyclohexyl radical having 3 to 10 carbon atoms, an aralkyl radical having 7 to 10 carbon atoms, or a phenyl radical, where two $R_5$ radicals may be either identical to one another or different from, one another, and n is an integer 0, 1 or 2;

bisphenol A;

the compounds identified in paragraphs [0013] and [0014] of EP 2 431 444 A1 (the disclosure content of this document is incorporated by reference into the present description in relation to these specific compounds).

It is of course also possible to utilize combinations of the stated developers, especially if two or more color formers are employed.

Individual color formers or a plurality of color formers in the adhesive composition are preferably encapsulated in a material together with a suitable developer and a matrix material, the matrix material being selected from the group consisting of alcohols, especially stearyl alcohol; ethers; ketones; carboxylic acids; acid amides; esters, more particularly those of the formula (III)

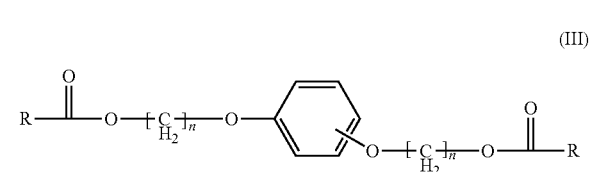

(III)

in which R is an alkyl or alkenyl group having 1 to 21 carbon atoms, it being possible for the two Rs to be identical or different, and where n is a number 1, 2 or 3; and combinations thereof.

The encapsulation may be by methods and in shell materials as described in DE 42 23 976 A1 and EP 2 431 444 A1; the relevant disclosure content of these documents is incorporated by reference into the present description.

The adhesive composition may exhibit at least one further color change on
an increase in the ambient temperature to a temperature $\geq T_3$, where $T_3 \leq T_1$ but greater than 20° C. (preferably >30° C., more preferably >40° C.) and where this further color change is preferably irreversible; and/or
a lowering of the ambient temperature to a temperature $\leq T_4$, where $T_4 \geq T_2$ but is less than 20° C. (preferably <0° C. more preferably <−10° C.) and where this further color change is preferably irreversible.

The aforementioned further color changes of the adhesive composition may be obtained by means of the color formers already identified above.

A further aspect of the invention relates to a system, intended in particular for producing an adhesive composition which exhibits thermal color changes. The system comprises, as components provided separately but for joint use as intended, i) an adhesive composition, more particularly thermoplastic adhesive composition, or constituents for its production, as described herein;

ii) one or more encapsulated color formers, as described herein, which
exhibit a first color change, especially reversible color change, on an increase in the ambient temperature to a temperature $\geq T_1$; and
exhibit a second color change, especially reversible color change, on a lowering of the ambient temperature to a temperature $\leq T_2$, where $T_1 > T_2$;

iii) optionally: a component, as described herein, which exhibits a further color change on an increase in the ambient temperature to a temperature $\geq T_3$, where $T_3 \leq T_1$ but greater than 20° C., preferably >30° C., more preferably >40° C., this further color change being preferably irreversible; and/or a lowering of the ambient temperature to a temperature $\leq T_4$, where $T_4 \geq T_2$ but is less than 20° C. (preferably <0° C., more preferably <−10° C.), this further color change being preferably irreversible;

iv) optionally: instructions for the as-intended joint use of components i) and ii), more particularly of components i) to iii).

A system may be used such that component i) and component ii) and also, optionally, the optional component iii) are mixed and then the mixture is applied, as an adhesive composition which exhibits thermal color changes to a substrate; or that component i) and component ii) are applied substantially separate from one another to a substrate, with component ii) and optionally component iii) being applied but in three-dimensional vicinity, preferably immediately adjacent, to component i); more preferably component ii) and optionally component iii) is given a coat of component i).

The adhesive compositions and/or systems described find use for visualizing temperature fluctuations on/with adhesive films; in solvent-based, especially crosslinking adhesives and coating materials; in aqueous, especially crosslinking adhesives and coating materials; in one-part adhesives; in two-part adhesives; in transparent labels; in transparent packaging, especially food packaging for products sensitive to cold and/or heat.

In accordance with the invention, the use of the system may make it possible to document the attainment of pre-defined limit temperatures, by color change. In particular, colored markers may be retained over the long term and therefore provide information on manipulations to products, especially bond sites, or interrupted cold chains and/or heat chains.

The invention is illustrated below with working examples and figures, without any intention that the subject matter of the invention should be confined to these embodiments.

FIG. 1: Hysteresis effect of a thermochromic pigment (schematic)

FIG. 2: Adhesive with embedded, encapsulated color formers over which a coat has been applied (schematic)

Figure 1:
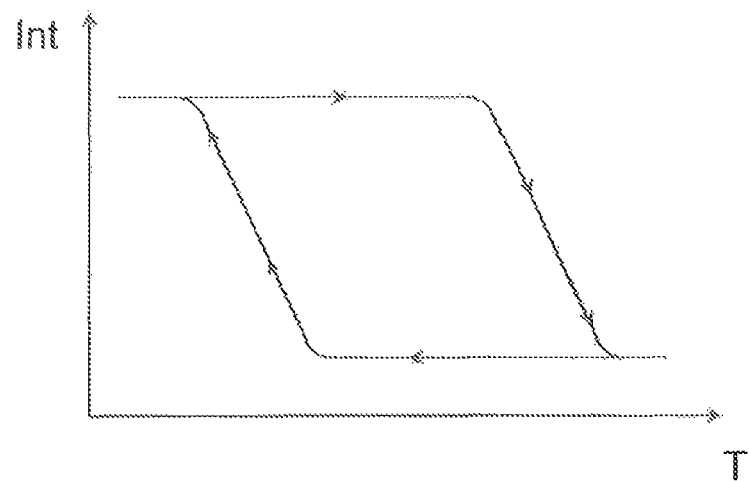
FIG. 1 shows, schematically, the hysteresis effect of a thermochromic color former which can be used in accordance with the invention, as elucidated above.
Figure 2:
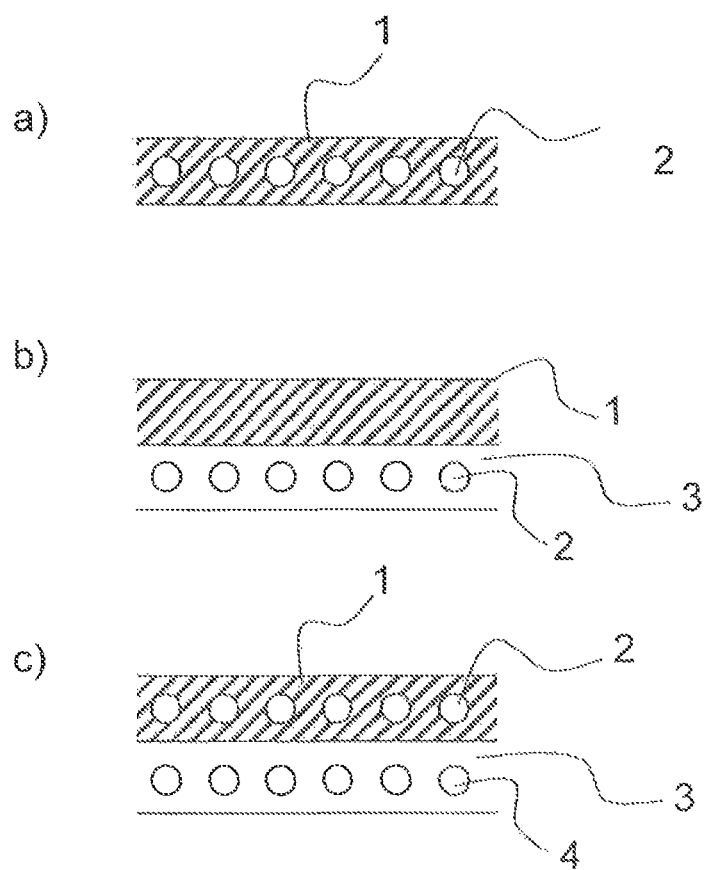
FIG. 2 shows a wide variety of different modes of embodiments of the invention.

FIG. 2a) shows the embedding, into a layer 1 (for example, an adhesive), of an encapsulated color system 2 containing at least one color former, at least one developer, and a suitable matrix, as elucidated above. The adhesive composition comprises the capsules containing the color pigments, and may be applied to a material, more particularly a bond site.

FIG. 2b) illustrates a layered arrangement. This arrangement may for example involve the steps of (1.) applying a first layer 3 (which need not necessarily be an adhesive) comprising an encapsulated color system 2 as described above to a material; and (2.) applying a second layer (in this case: a top layer 1) to the first layer 3 which has already been applied. The second layer/top layer 1 as well need not necessarily be an adhesive. In particular there are also applications of the invention possible that do not necessarily entail an adhesive bond, as will be elucidated more below.

Shown in FIG. 2c) is a further layered arrangement, with the first layer 1 containing an encapsulated color system as already elucidated above in connection with FIG. 2a). Included in a further layer 3 is a further color system 4, which in addition to the color changes at $T_1$ and $T_2$ also displays at least one further color change at $T_3$ and/or $T_4$, as already elucidated above.

It is evident that the application conditions have to be adapted to the color change conditions. In the case of hot-melt application methods, of course, irreversible color change temperatures must not be reached/exceeded. Where appropriate, dispersions or solvent-based systems must be selected in order to apply certain layers which comprise such color systems. Suitable application methods are selected by the skilled person in routine experiments.

EXAMPLE 1

Formulations Acrylate-Based, UV-Crosslinkable

|  | Formulation #1 | Formulation #2 |
| --- | --- | --- |
| acResin A204 (BASF SE) | 99.7 wt % | 87.7 wt % |
| Irganox B 612 (BASF SE) | 0.3 wt % | 0.3 wt % |
| Color system* | 0 wt % | 12.0 wt % |

*The color system used contains about 1/3 color pigments, corresponding to 4 wt % (based on the total composition).

Adhesive Tests
Carrier material: PET Mylar 50 μm
Coating weight: 25 g/m², coated directly;
Crosslinking: 20 mJ/cm² IST UV Minicure, H lamp, 120 W/cm (9.5 A)

|  | #1 | #2 |
| --- | --- | --- |
| 180° peel adhesion to steel after 24 h (N/25 mm); PSTC 101 | 11 | 8.4 AF |
| Shear temperature on steel at 70° C. 1000 g/25 × 25 mm/ conditioned for 24 h after bonding, value in min.; PSTC 107 | >100 | >100 |
| Shear temperature on steel (SAFT) 0.5° C./min./1000 g/25 × 25 mm/ conditioned for 24 h after bonding, value in ° C. | >90 | >90 |

AF: Adhesive fracture

The indication "PSTC" for the purposes of this specification always relates to "*Test Methods for Pressure Sensitive adhesive Tapes, 15th Edition* (2007)".

The term "conditioned" refers, for the purposes of this specification, always to 23° C. and 50% rh.

EXAMPLE 2

Formulations #3 and #4

|  | #3 | #4 |
| --- | --- | --- |
| TER SIS 1209 (TER HELL & CO GMBH) | 40 wt % | 34.8 wt % |
| Suzkorez SU 90 (KOLON Industries, Inc.) | 46 wt % | 40.0 wt % |
| Edelex 946 (Shell Group) | 13 wt % | 11.3 wt % |
| Irganox B225 (BASF SE) | 1 wt % | 1.0 wt % |
| Color system (as example 1; see above) | — | 12 wt % |

Adhesive Tests
Carrier material: BOPP 40 μm
Coating weight provided: 25 g/m²

|  | #3 | #4 |
|---|---|---|
| 180° peel adhesion to steel after 24 h (N/25 mm); PSTC 101 | 11.8 AF | 9.1 AF |
| Shear strength on steel at 23° C. 500 g/12.5 × 12.5 mm/min.; PSTC 107 | >4400 | >4400 |
| Shear temperature on steel (SAFT) 0.5° C./min./1000 g/12.5 × 25 mm/ conditioned for 24 h after bonding, average value from 6 experiments, value in ° C. | 69 CF/1xAF | 71 CF/D |

AF: Adhesive fracture,
CF: cohesive fracture,
D: haze

While the addition of the color system does influence the technical adhesive properties (see compositions #2 in comparison to #1 and #4 in comparison to #3), it only does so significantly at the 180° C. peel strength, and only to a small extent. For many applications, the peel strength values that can be achieved continue to be entirely sufficient.

Use of Formulations #2 and #4

Examples of the use of the inventive compositions #2 and #4 are their use as a cold indicator in the case of security pouches (Duty Free, purses, etc).

A bag sealed with a conventional adhesive can be manipulated by means of heat (if, therefore, the adhesive optionally melts) or by cold (if the temperatures goes below the glass transition temperature of the adhesive and the adhesive therefore becomes fragmented, and the adhesion is lost) in such a way that opening and changing of the pouch contents is possible without the manipulation being subsequently visible. The bag, then, could be bonded closed again and at room temperature is later on again in the same condition as before the manipulation.

A bag sealed with a #2 or #4 color system of the invention has different characteristics:

The bond site is cooled with an ice spray. The adhesion disappears and the bag can be opened. However a color change becomes visible, thereby indicating the manipulation. By heating to more the 70° C. it is in fact possible to reverse the color change of the thermochromic color system. However, the (irreversible) change of a further color indicator at a temperature well above room temperature, but still below 70° C., prevents the manipulation later on being able no longer to be detected at all. The overall system will always display the manipulation reliably.

In particular there are also applications of the invention where the adhesive bonding of materials is not necessarily a factor. It is possible, for example, to produce sealing films where the color systems of the invention are present only in a subregion. Hence, when the temperatures are above or below the limit temperatures, not only full-area colors but also, for example, patterns or indicia may be made to appear. Embodiments of this kind can be accomplished particularly easily with a multi-layer construction, with application of a color system in a lower layer which is applied only in subregions (corresponding to the pattern/the writing). This color system is subsequently covered with a top layer, more particularly a whole-area top layer. In view of the fact that the bottom layer is applied only in subregions, the top layer in the remaining regions has contact with the substrate as well. This is especially advantageous when the top layer comprises an adhesive. That adhesive is then able to develop its full adhesive force in the areas of contact with the substrate. In this way, bonds can be achieved which essentially exhibit the commonly very good adhesive-bonding qualities, since the color system has been applied only in a few subregions (something which is very often sufficient).

The invention claimed is:

1. A polymeric composition, more particularly an adhesive composition, which:
    exhibits a first color change during an increase in the ambient temperature to a temperature $\geq T_1$; and
    exhibits a second color change during a lowering of the ambient temperature to a temperature $\leq T_2$;
    where $T_1 > T_2$;
    wherein the composition exhibits at least one further color change on at least one of:
        an increase in the ambient temperature to a temperature $\geq T_3$, where $T_3 \leq T_1$ but greater than 20° C. and
        a lowering of the ambient temperature to a temperature $\leq T_4$, where $T_4 \geq T_2$ but is less than 20° C.,
    and the further color change is irreversible.

2. The composition according to claim 1, wherein
    the composition is thermoplastic; or
    the composition is a solvent-based composition or a dispersion.

3. The composition according to claim 1, wherein the composition has a melt viscosity at a temperature of 160° C. in the range from 1 Pa*s to 1000 Pa*s.

4. The composition according to claim 1, wherein the composition has a melt viscosity at a temperature of 160° C. in the range from 10 Pa*s to 40 Pa*s.

5. The composition according to claim 1, wherein in use as intended the composition has a 180° peel adhesion to steel of more than 5 N/25 mm measured by method 101 of the PSTC "Test Methods for Pressure Sensitive Adhesive Tapes", 15th ed. (2007).

6. The composition according to claim 1, wherein in use as intended the composition has a 180° peel adhesion to steel of more than 6.25 N/25 mm measured by method 101 of the PSTC "Test Methods for Pressure Sensitive Adhesive Tapes", 15th ed. (2007).

7. The composition according to claim 1, wherein the composition is post crosslinkable.

8. The composition according to claim 1, wherein the composition is post crosslinkable by exposure to UV radiation.

9. The composition according to claim 1, wherein the composition has constituents selected, alone or in combination, from the group consisting of:
    elastomers;
    tackifier resins;
    plasticizers; and
    combinations thereof.

10. The composition according to claim 1, wherein both the first and the second color changes are reversible.

11. The composition according to claim 1, wherein
    i) only the first color change; or
    ii) only the second color change; or
    iii) both the first and the second color changes
    is/are brought about by one or more encapsulated color formers.

12. The composition according to claim 11, wherein the color former or formers are selected from the group consisting of triphenylmethane compounds, fluoran compounds, phenothiazine compounds, indolylphthalido compounds, leucoauramine compounds, spiropyran compounds, rhodamine lactum compounds, azaphthalide compounds, benzoxazine compounds, diphenylmethane phthalides, phenylindolyl phthalides, indolyl phthalides, diphenylmethane azaphthalides, phenylindolyl azaphthalides, fluorans, styrylquinolines, diazarhodamine lactones.

13. The composition according to claim 11, wherein the color former or formers are encapsulated together with a developer, the developer being selected from the group consisting of:
compounds of the formula (I)

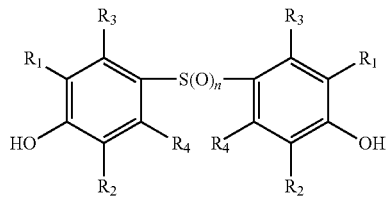

(I)

in which R1 and R2 are each a hydrogen atom, an alkyl radical having 1 to 3 carbon atoms, or a halogenated alkyl radical having 1 to 3 carbon atoms, a hydroxyl radical, a cyclohexyl radical or a phenyl radical (but if one of R1 and R2 is either cyclohexyl or phenyl radical, then the other is a hydrogen atom), R3 and R4 are each a hydrogen atom, an alkyl radical having 1 to 15 carbon atoms, a halogenated alkyl radical having 1 to 15 carbon atoms, a hydroxyl radical, a cyclohexyl radical, or a phenyl radical, where two of R1 to R4 may be different or identical to one another, but not all of R1 to R4 may be hydrogen atoms, and n is an integer 0, 1 or 2;
compounds of the formula (II)

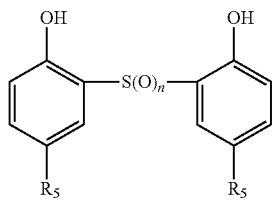

(II)

in which R5 is an alkyl radical having 1 to 12 carbon atoms, a cyclohexyl radical having 3 to 10 carbon atoms, an aralkyl radical having 7 to 10 carbon atoms, or a phenyl radical, where two R5 radicals may be either identical to one another or different from one another, and n is an integer 0, 1 or 2;
bisphenol A;
and combinations thereof.

14. The composition according to claim 11, wherein the color former or formers are encapsulated together with a matrix material, and the matrix material is selected from the group consisting of: alcohols; ethers; ketones; carboxylic acids; acid amides; esters; and combinations thereof.

15. The composition according to claim 14, wherein esters are those of the formula (III)

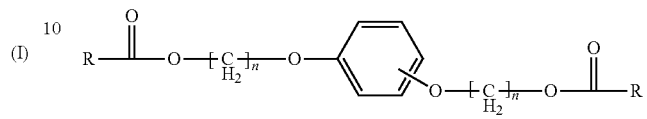

(III)

in which R is an alkyl or alkenyl group having 1 to 21 carbon atoms, it being possible for the two Rs to be identical or different, and where n is a number 1, 2 or 3.

16. The composition according to claim 1, wherein the third color change is brought about by color formers which are selected from the group consisting of color formers of the adhesive composition selected from the group consisting of triphenylmethane compounds; fluoran compounds; phenothiazine compounds; indolylphthalido compounds; leucoauramine compounds; spiropyran compounds; rhodamine lactum compounds; azaphthalide compounds; benzoxazine compounds; diphenylmethane phthalides; phenylindolyl phthalides; indolyl phthalides; diphenylmethane azaphthalides; phenylindolyl azaphthalides; fluorans; styrylquinolines; diazarhodamine lactones; and mixtures thereof.

17. A system which exhibits thermal color changes, according to claim 1, comprising, as components provided separately but for joint use as intended,
i)—a polymeric composition or constituents for its production;
a solvent-based polymeric composition, or constituents for its production; or
a polymer dispersion, or constituents for its production;
ii) one or more encapsulated color formers which
exhibit a first color change, on an increase in the ambient temperature to a temperature ≥T1; and
exhibit a second color change, on a lowering of the ambient temperature to a temperature ≤T2, where T1>T2.

18. A method applying a system according to claim 17 to a substrate, wherein
component i) and component ii) are mixed and then the mixture is applied, as a polymeric composition which exhibits thermal color changes, to a substrate; or
component i) and component ii) are applied substantially separate from one another to a substrate with component ii).

* * * * *